United States Patent
Schmidt et al.

(10) Patent No.: US 7,162,016 B1
(45) Date of Patent: Jan. 9, 2007

(54) MULTIMEDIA ADAPTER FOR HEADSET AMPLIFIER

(75) Inventors: Peter Schmidt, Campbell, CA (US);
Jeffrey S. Jones, Los Altos, CA (US);
John Magnasco, San Jose, CA (US);
Ron Van Thiel, Menlo Park, CA (US);
Paul Espinola, San Jose, CA (US)

(73) Assignee: Hello Direct, Inc., San Jose, CA (US)

( * ) Notice: Subject to any disclaimer, the term of this patent is extended or adjusted under 35 U.S.C. 154(b) by 593 days.

(21) Appl. No.: 10/150,700

(22) Filed: May 17, 2002
(Under 37 CFR 1.47)

(51) Int. Cl.
*H04M 11/00* (2006.01)
(52) U.S. Cl. .................... 379/100.15; 379/387.01; 379/428.01; 379/428.02
(58) Field of Classification Search .......... 379/387.01, 379/428.01, 428.02, 430, 437, 308, 90.01, 379/110.01, 432, 100.15
See application file for complete search history.

(56) References Cited

U.S. PATENT DOCUMENTS

| | | | |
|---|---|---|---|
| 3,955,051 A | 5/1976 | Bitzer et al. .............. 179/2 DP |
| 4,219,789 A | 8/1980 | Frangos ..................... 333/32 |
| 4,517,413 A | 5/1985 | Pavitt, Jr. ................. 179/81 R |
| 4,653,087 A * | 3/1987 | Galich ................... 379/110.01 |
| 4,754,484 A | 6/1988 | Larkin et al. .............. 379/430 |
| 4,879,746 A | 11/1989 | Young et al. .............. 379/399 |
| 4,893,331 A | 1/1990 | Horiuchi et al. ............. 379/93 |
| 4,941,187 A | 7/1990 | Slater ..................... 381/86 |
| 4,993,060 A | 2/1991 | Kelly ..................... 379/55 |
| 5,058,155 A * | 10/1991 | Larsen ..................... 379/442 |
| 5,099,514 A | 3/1992 | Acree ..................... 379/441 |
| 5,185,789 A | 2/1993 | Hanon et al. .............. 379/395 |
| 5,226,077 A | 7/1993 | Lynn et al. ................ 379/395 |
| 5,235,637 A | 8/1993 | Kraz et al. ................ 379/387 |
| D340,722 S | 10/1993 | Bungardt .................. D14/242 |
| 5,337,343 A | 8/1994 | Stickney .................. 379/45 |
| 5,402,499 A | 3/1995 | Robison et al. ............ 381/119 |
| 5,448,646 A * | 9/1995 | Lucey et al. ................ 381/74 |
| 5,450,496 A | 9/1995 | Burris et al. ............... 381/183 |
| 5,455,859 A | 10/1995 | Gutzmer .................. 379/442 |
| 5,475,872 A | 12/1995 | Sato ..................... 455/89 |
| 5,483,579 A | 1/1996 | Stogel ..................... 379/88 |
| 5,488,657 A | 1/1996 | Lynn et al. ................ 379/395 |

(Continued)

*Primary Examiner*—Matthew D. Anderson
*Assistant Examiner*—Tuan Pham
(74) *Attorney, Agent, or Firm*—Haverstock & Owens LLP

(57) ABSTRACT

An adapter apparatus for coupling a headset and an audio device to a telephone headset amplifier includes a first interface for sending and receiving audio signals with the telephone headset amplifier, a second interface for sending and receiving audio signals with the headset, a third interface for sending receiving audio signals with the audio device, and a switching circuit coupled to the three interfaces, wherein the switching circuit provides a communications link between at least two of the first interface, the second interface, and the third interface as a function of a selected mode. In a first mode, a communications link between the second interface and the third interface is established where the audio device either provides audio signals to or receives audio signals from the headset. In a second mode, a communications link between the first interface, the second interface, and the third interface is established where the audio device receives audio signals from the headset and from the telephone headset amplifier over the communications link. In a third mode, a communications link between the first interface, the second interface, and the third interface is established where the audio device provides audio signals to the headset and to the telephone headset amplifier over the communications link.

20 Claims, 3 Drawing Sheets

U.S. PATENT DOCUMENTS

| | | | |
|---|---|---|---|
| 5,493,609 A | 2/1996 | Winseck, Jr. et al. | 379/96 |
| 5,504,812 A | 4/1996 | Vangarde | 379/430 |
| 5,544,230 A | 8/1996 | Megyesi | 379/67 |
| 5,608,797 A * | 3/1997 | Larsen et al. | 379/442 |
| 5,631,745 A | 5/1997 | Wong et al. | 358/434 |
| 5,668,868 A | 9/1997 | Nordenstrom | 379/447 |
| 5,694,467 A * | 12/1997 | Young, III | 379/430 |
| 5,729,603 A | 3/1998 | Huddart et al. | 379/387 |
| 5,761,298 A | 6/1998 | Davis et al. | 379/430 |
| 5,769,269 A | 6/1998 | Peters | 221/7 |
| 5,825,873 A | 10/1998 | Duncan et al. | 379/419 |
| 5,835,852 A | 11/1998 | Bundgardt | 455/90 |
| 5,854,830 A | 12/1998 | Kenmochi | 379/100.15 |
| 5,867,559 A | 2/1999 | Jorgensen et al. | 379/67 |
| 5,894,504 A | 4/1999 | Alfred et al. | 379/88.13 |
| 5,991,398 A | 11/1999 | Lipton et al. | 379/383 |
| 6,091,812 A * | 7/2000 | Iglehart et al. | 379/308 |
| 6,141,418 A * | 10/2000 | Weiser et al. | 379/454 |
| 6,683,952 B1 * | 1/2004 | Bernardi et al. | 379/447 |
| 2004/0044805 A1 * | 3/2004 | Mac Farlane | 710/1 |

* cited by examiner

MULTIMEDIA ADAPTER FOR HEADSET AMPLIFIER

FIELD OF THE INVENTION

This invention relates to the field of telephone devices. More particularly, this invention relates to a method of and apparatus for providing communication links between a telephonic device and an external multimedia device.

BACKGROUND OF THE INVENTION

Telephones have become more than just a communications device, telephones are being utilized more and more as productivity enhancement tools. Sales representatives prospect over the telephone, customer service representatives working in call centers provide support to a company's customer base, administrative personnel send and receive calls relative to general company operations, etc. As more time is spent on the telephone, telephone headsets have proven to increase user efficiency while providing improved comfort and convenience.

While working, many people prefer to listen to audio from the radio, internet or other audio sources. Unfortunately, such audio sources can contribute to a noisy and distracting work environment. For this reason, the use of headphones to listen to the audio source is desirable. However, if a user is using a telephone headset it is extremely inconvenient to switch between the telephone headset and the headset for the audio device, and vice-versa. Even if the user is not using a telephone headset, it is inconvenient to switch between the audio source headset and the handset of a telephone.

Using the telephone as a productivity tool is further enhanced by increasing the telephone's functionality. Interfacing the telephone with external multimedia devices provides the user with improved means for communication. Linking the telephone with a recording device provides the user with a means for dictation, or a means for recording the conversation between the user and the person at the other end of the telephone call. Alternatively, the telephone can be linked to a device that includes a speech recognition application whereby the user can provide verbal instructions or save verbal comments as a text file. An audio source can also be linked to the telephone to provide audio to the user or to the person on the other end of the telephone call. Such functionality is useful for playing back a previously recorded speech or presentation, or simply to provide music in a non-obtrusive manner.

Unfortunately, conventional means for providing an interface between a telephone and an external multimedia device typically requires additional hardware that is expensive to purchase and time consuming to implement. What is needed is an affordable, easy-to-use device that provides recording and playback functionality. What is further needed is a device that is convenient to use with existing telephonic equipment.

SUMMARY OF THE INVENTION

The invention is an adapter apparatus for coupling a headset and an audio device to a telephone headset amplifier, the adapter apparatus includes a first interface for sending audio signals to and receiving audio signals from the telephone headset amplifier, a second interface for sending audio signals to and receiving audio signals from the headset, a third interface for sending audio signals to and receiving audio signals from the audio device, and a switching circuit coupled to the first interface, the second interface, and the third interface, wherein the switching circuit provides a communications link between at least two of the first interface, the second interface, and the third interface as a function of a selected mode. The switching circuit can provide a communications link between the second interface and the third interface when a first mode is selected, where the audio device provides audio signals over the communications link to the headset. The audio device can be one of a selective CD player, cassette tape player, MP3 player, sound card, CD-port from a computer, and another headset with a microphone. The switching circuit can provide a communications link between the second interface and the third interface when a first mode is selected, where the audio device receives audio signals over the communications link from the headset. The switching circuit can provide a communications link between the first interface, the second interface, and the third interface when a second mode is selected, where the audio device receives audio signals from the headset and from the telephone headset amplifier over the communications link. The audio device can be an audio recording device or a speech recognition device. The second mode can enable a conventional telephone call to be established between a user of the headset and a called party via the telephone headset amplifier. The switching circuit can provide a communications link between the first interface, the second interface, and the third interface when a third mode is selected, where the audio device provides audio signals to the headset and to the telephone headset amplifier over the communications link. The adapter apparatus can include a mode selection switch for selecting the mode.

DETAILED DESCRIPTION OF THE PREFERRED EMBODIMENT

The present invention is an adapter apparatus that connects a headset to at least one of a telephone headset amplifier and an external multimedia device. The multimedia device can be a device capable of producing sound, for example a CD player, a cassette tape player, MP3 player, sound card, a CD-port from a computer, or another headset with microphone. Additionally, the multimedia device can be a device capable of receiving sound, for example a tape recorder, a writable CD recorder, a computer capable of storing sound files, or any voice recognition application.

The preferred embodiment of the present invention provides three modes. A first mode provides a communication link between the headset and the multimedia device. If the multimedia device is for producing audio, then the headset user can listen to the audio produced by the multimedia device. If the multimedia device is for receiving audio, then the headset user can record by speaking into the headset microphone, or the user can speak to a speech recognition application. The first mode enables the user to listen to sound files and other recordings; record their voice for notes, dictation, and speech recognition; use voice activated gaming and other applications that recognize voice commands; and use the internet for phone calls.

A second mode provides a communication link between the headset, the multimedia device and the telephone headset amplifier. In the second mode, the multimedia device is for receiving audio, and the communication link enables the user to place a telephone call in the conventional manner while providing both sides of the telephone conversation to the multimedia device for recording.

A third mode also provides a communication link between the headset, the multimedia device and the telephone headset amplifier. However, in the third mode the multimedia device is for producing audio, and the communication link enables the user to place a telephone call in the conventional manner while providing audio from the multimedia device to both sides of the telephone conversation.

Figure 1:
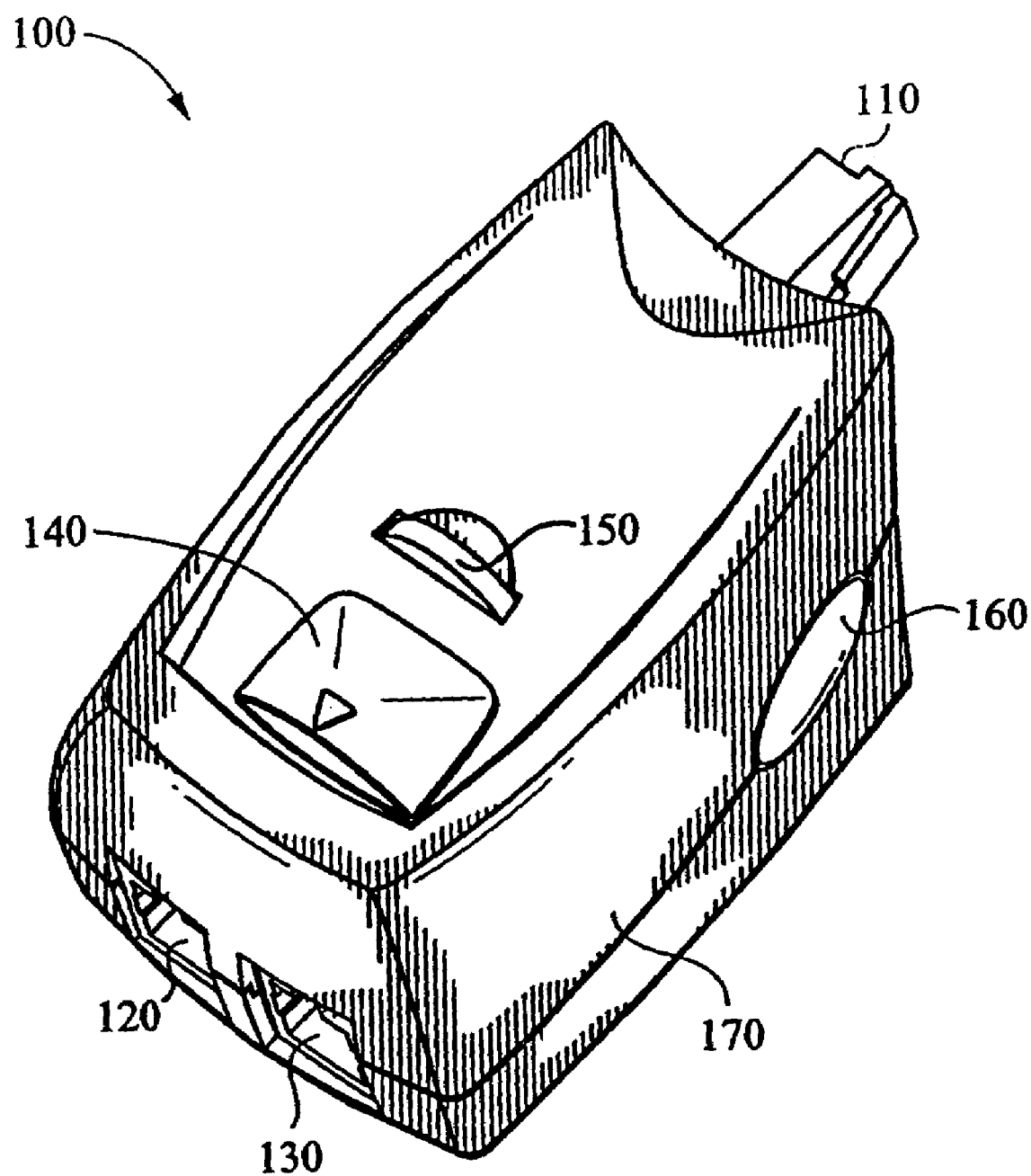
FIG. 1 illustrates a perspective view of the preferred embodiment of the present invention.

FIG. 1 illustrates a perspective view of the preferred embodiment of the present invention. A multimedia adapter 100 includes a headset amplifier interface 110, a headset interface 120, a multimedia interface 130, a mode selector switch 140, an adapter volume control 150, a clip release button 160, and a housing 170. The headset amplifier interface 110 is preferably an RJ-9 jack to be coupled with an RJ-9 port of a headset amplifier (not shown).

The RJ-9 jack 110 is of the conventional type and is of substantially rigid plastic or polymer. A multi-conducting wire is inserted into the RJ-9 jack 110 and electrically coupled to contacts of the RJ-9 jack 110 in the usual way. The wire is thinner than the opening into which it is inserted, as such there is a void or partial void surrounding or around the wire. The RJ-9 jack 110 is preferably insert molded to the housing 170 or to a detachable member (not shown) that is mounted to the housing 170. In other words, the housing 170 is over-molded into the RJ-9 jack 110 so that the mold plastic fills the void with the RJ-9 jack 110 as well as extending outside the RJ-9 jack 110, resulting in a rigid extension. In this manner the RJ-9 jack 110 is a rigid extension of the housing 170. Such a rigid extension provides for a secure coupling of the multimedia adapter 100 to the headset amplifier. Although the headset amplifier interface 110 has been described as an RJ-9 jack 110, it should be clear that any appropriate electro-mechanical interface is applicable.

The headset interface 120 and the multimedia interface 130 are each preferably RJ-9 ports, although it should be clear that any appropriate type of electro-mechanical interface that provides a communications link between a headset and the multimedia adapter 100, and between a multimedia device and the multimedia adapter 100 can be used.

The mode selector switch 140 enables the user to manually select between the first, second, and third modes of operation. The adapter volume control 150 enables the user to control the volume of a multimedia device as heard by the called party. The adapter volume control 150 does not control the volume of the multimedia device as heard by the user. The volume of the multimedia device, and of the called party, heard by the user is controlled by the headset amplifier in the conventional manner.

In the preferred embodiment, a second clip release button 160, not shown in FIG. 1, is located on the opposite side of the multimedia adapter 100. The multimedia adapter 100 is connected to the headset amplifier by inserting the RJ-9 jack 110 into the RJ-9 port of the headset amplifier, the RJ-9 port of the headset amplifier is where a telephone headset is conventionally inserted. To release the multimedia adapter 100 from the headset amplifier, the user depresses the two clip release buttons 160 and pulls the multimedia adapter 100 from the headset amplifier.

Figure 2:
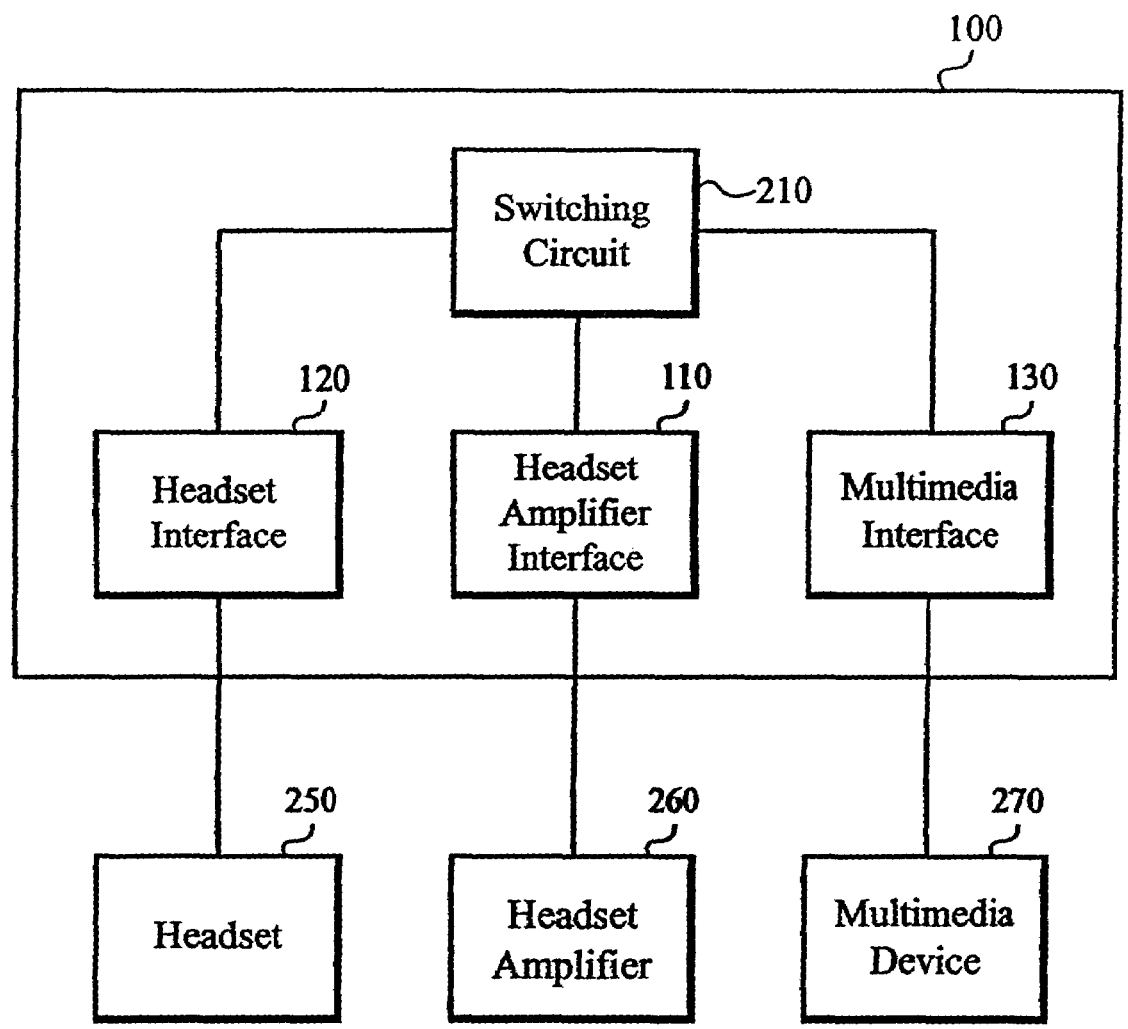
FIG. 2 is a block diagram of the adapter apparatus of the present invention.

FIG. 2 is a block diagram of the adapter apparatus of the present invention. Same elements as to FIG. 1 are labeled with the same numbers. The multimedia adapter 100 includes a switching circuit 210 coupled to the headset interface 120, the headset amplifier interface 110, and the multimedia interface 130. A headset 250 is coupled to the headset interface 120. A headset amplifier 260 is coupled to the headset amplifier interface 110. A multimedia device 270 is coupled to the multimedia interface 130.

Figure 3:
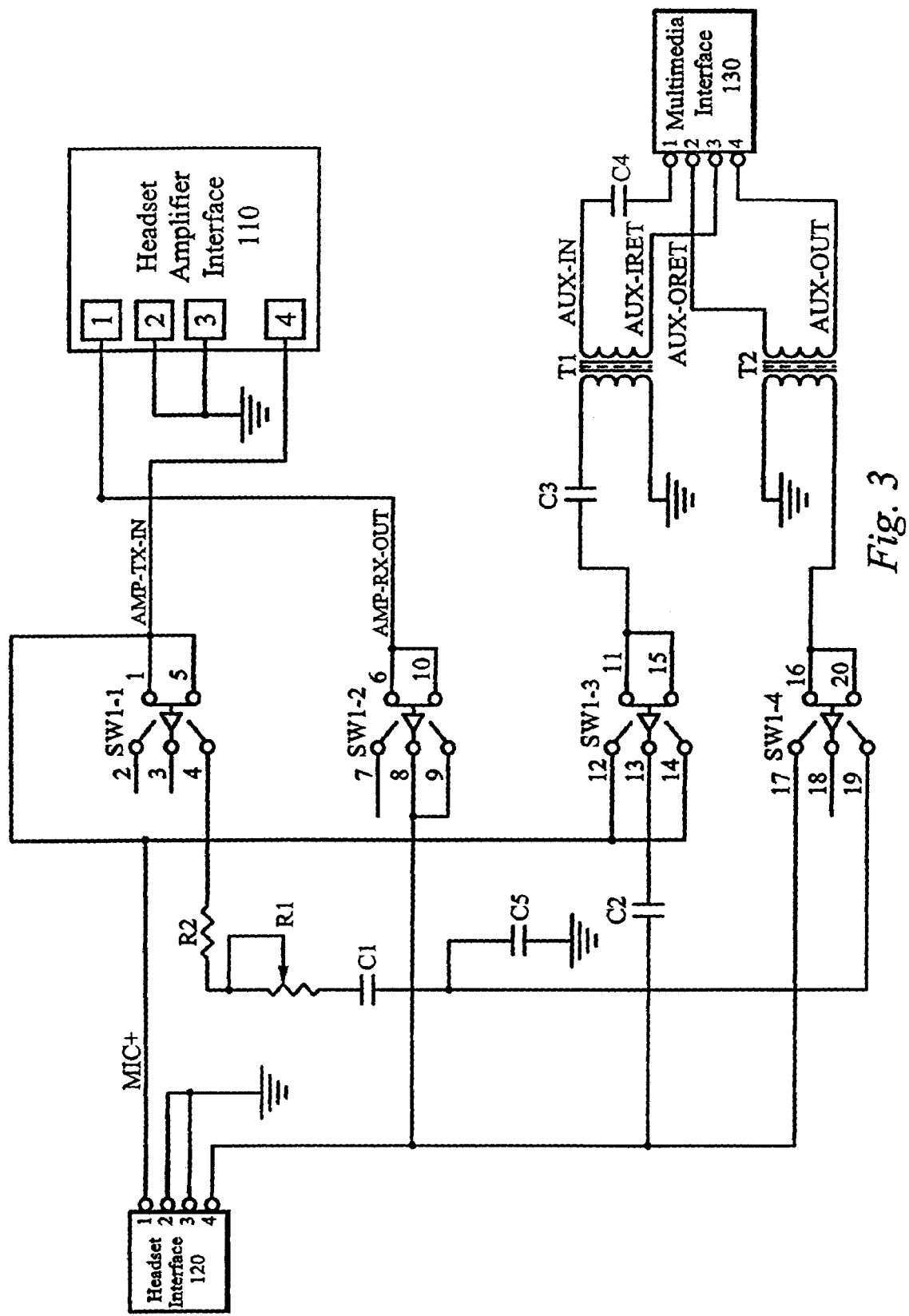
FIG. 3 is a circuit diagram of the preferred embodiment of the present invention.

FIG. 3 is a circuit diagram of the preferred embodiment of the present invention. The circuit includes the headset interface 120, the headset amplifier interface 110, the multimedia interface 130, variable resistor R1, resistor R2, capacitors C1, C2, C3, C4, and C5, transformers T1 and T2, and switching elements SW1-1, SW1-2, SW1-3, and SW1-4. In practice, switching elements SW1-1, SW1-2, SW1-3, and SW1-4 can all be wipers of a four-pole three-position switch SW1. Switch SW1 is preferably a 20-pin, 3-position switch where SW1-1 includes pins 1–5, SW1-2 includes pins 6–10, SW1-3 includes pins 11–15, and SW1-4 includes pins 16–20.

The headset interface 120 and the multimedia interface 130 are preferably RJ-9 ports, and the headset amplifier interface 110 is preferably an RJ-9 jack. A first contact of the RJ-9 port 120 is coupled to pins 1 and 5 of SW1-1 and to pins 12 and 14 of SW1-3. Pins 1 and 5 are both coupled together and tied to the input of the headset amplifier interface 110. A second and third contact of the RJ-9 port 120 are coupled to ground. A fourth contact of the RJ-9 port 120 is coupled to pins 8 and 9 of SW1-2, to pin 13 of SW1-3 via the capacitor C2, and to pin 17 of SW1-4. The first contact of RJ-9 port 120 provides audio signals from the microphone of the headset 250, and the fourth contact of the RJ-9 port 120 receives audio signals to be sent to the headphones of the headset 250.

Pin 4 of SW1-1 is coupled to a first terminal of R2. A second terminal of R2 is coupled to a first terminal of R1. R1 is a variable resistor that provides volume control corresponding to the adapter volume control 150 in FIG. 1. The second terminal of R1 is coupled to a first terminal of C1. A second terminal of C1 is coupled to both a first terminal of C5 and to pin 19 of SW1-4. A second terminal of C5 is coupled to ground.

Pins 6 and 10 of SW1-2 are coupled together and tied to the output of the headset amplifier interface at a contact 1 of the RJ-9 jack 110. A contact 2 and 3 of the RJ-9 jack 110 are coupled to ground. Pins 11 and 15 of SW1-3 are coupled together and tied to a first terminal of C3. A second terminal of C3 is coupled to T1, T1 is coupled to the input of the multimedia interface at contact 3 of the RJ-9 jack 130 and at contact 1, via C4, of the RJ-9 jack 130. Pins 16 and 20 of SW1-4 are coupled together and tied to T2, T2 is coupled to the output of the multimedia interface at contacts 2 and 4 of the RJ-9 jack 130.

Power is preferably supplied to the circuit from the headset amplifier 260. Alternatively power is supplied from any conventional power source.

By convention, the first mode of operation corresponds to the up position for switching elements SW1-1 pin 2, SW1-2 pin 7, SW1-3 pin 12, and SW1-4 pin 17. Similarly, the second mode corresponds to the middle position pins and the third mode corresponds to the down position pins. As indicated in FIG. 3, the switching elements SW1-1, SW1-2, SW1-3, and SW1-4 are all in the middle position. This is for illustrative purposes only, the actual operational mode of the switching elements is determined by which one of the first, second, or third modes has been selected by the user. The use of the terms up, middle, and down are relative to the drawing of FIG. 3 only and may or may not bear on the physical construction of a device. More particularly, the up position in SW1-1 provides a connection across SW1-1 to a contact point with pin 2. Similarly, the middle position in SW1-1 is to pin 3 and the down position in SW1-1 is to pin 4. The up, middle, and down positions in SW1-2 provide connections across SW1-2 to contact points with pins 7, 8, and 9, respectively. The up, middle, and down positions in SW1-3 provide connections across SW1-3 to contact points with pins 12, 13, and 14, respectively. The up, middle, and down positions in SW1-4 provide connections across SW1-2 to contact points with pins 17, 18, and 19, respectively.

According to the preferred embodiment, in operation, the user manually selects the mode of operation by positioning the mode selector 140 into either the first mode, the second mode, or the third mode. In the first mode, the switching elements SW1-1, SW1-2, SW1-3, and SW1-4 are all in the up position. In the up position, SW1-1 and SW1-2 are effectively open and do not provide a connection. SW1-3 provides an electrical path between the headset interface 120 and the multimedia interface 130. If the multimedia device is a device for receiving audio, then the microphone of the headset 250 provides an audio signal to the multimedia device 270. SW1-4 provides an electrical path between the headset interface 120 and the multimedia interface 130. If the multimedia device 270 is an audio source, then the multimedia device 270 provides audio signals to the headphones of the headset 250. In the first mode, there is no electrical path provided between the headset amplifier 260 and the multimedia device 270. It should be noted that regardless of the mode selected, the microphone of the headset 250 provides audio signals to the headset amplifier 260.

In the second mode, the switching elements SW1-1, SW1-2, SW1-3, and SW1-4 are all in the middle position. In the middle position, SW1-1 and SW1-4 are effectively open and do not provide an electrical path. Since SW1-4 is open and it is coupled to the output of the multimedia interface 130, no functionality is provided if the multimedia device 270 is an audio source. The second mode is designed to provide audio signals to the multimedia device 270, not to receive audio signals from the multimedia device 270. The microphone of the headset 250 provides audio signals through the headset interface 120 to the headset amplifier interface 110. The headset amplifier interface provides the microphone audio signal to the headset amplifier 260. Using conventional sidetone feedback, the headset amplifier 260 provides the microphone audio signal back to the headset amplifier interface 110. Additionally, the headset amplifier 260 converts audio signals from the telephone and provides the converted audio signals to the headset amplifier interface 110. The headset amplifier interface 110 provides the audio signals of the microphone and the telephone to SW1-2. The SW1-2 provides an electrical path between the headset amplifier interface 110 and the headset interface 120. SW1-2 also provides an electrical path between the headset amplifier interface 110 and SW1-3. The SW1-3 provides an electrical path between the SW1-2 and the multimedia interface 130. The multimedia interface 130 provides the received audio signals to the multimedia device 270. In this manner, audio signals generated by the microphone and the telephone are provided to the multimedia device 270. Preferably, a telephone conversation between the headset user and the called party on the other end of the telephone is recorded by the multimedia device 270. Clearly, alternative applications are possible.

In the third mode, the switching elements SW1-1, SW1-2, SW1-3, and SW1-4 are all in the down position. The third mode is designed to provide audio signals from the multimedia device 270 to both the headset 250 and the headset amplifier 260. The multimedia device 270 provides an audio signal to the multimedia interface 130. The multimedia interface 130 provides the audio signal to the SW1-4. The SW1-4 provides an electrical path between the output of the multimedia interface 130 and SW1-1. The SW1-1 provides an electrical path between SW1-4 and the headset amplifier interface 110. Additionally, the microphone of the headset 250 provides audio signals through the headset interface 120 to the headset amplifier interface 110. The headset amplifier interface provides the audio signals from the microphone and the multimedia device 270 to the headset amplifier 260. Using conventional sidetone feedback, the headset amplifier 260 provides the audio signals back to the headset amplifier interface 110. Additionally, the headset amplifier 260 provides converted audio signals from the telephone to the headset amplifier interface 110. The headset amplifier interface 110 provides the converted telephone signals and the audio signals from the microphone and the multimedia device to SW1-2. The SW1-2 provides an electrical path between the headset amplifier interface 110 and the headset interface 120. The SW1-3 provides an electrical path between the headset interface 120 and the multimedia interface 130. In this manner, audio signals provided by the multimedia device 270 are heard by both the headset user and the called party on the other end of the telephone. Preferably, in the third mode pre-recorded audio is played back by the multimedia device 270 to the headset user and the called party, although alternative applications are clearly possible.

Although the circuit diagram of FIG. 3 has been described as a specific embodiment, it should be clear to those skilled in the art that the circuit diagram can be designed using any number of switches and passive elements, in any number of configurations, to accomplish the desired functionality.

This invention has been described in terms of specific embodiment incorporating details to facilitate the understanding of the principles of construction and operation of the invention. Such reference herein to specific embodiment and the details thereof is not intended to limit the scope of the claims and hereto. It will be apparent to those of ordinary skill in the art that modifications can be made in the embodiment chosen for illustration without departing from the spirit and scope of the invention. Specifically, it will be apparent to one of ordinary skill in the art device that the present invention could be implemented in several different ways and the apparatus disclosed above is only illustrative of the before embodiment invention and is in no way limitation.

What is claimed is:

1. An adapter apparatus for coupling a headset and an audio device to a telephone headset amplifier, the apparatus comprising:
   a. a first interface for sending audio signals to and receiving audio signals from the telephone headset amplifier;
   b. a second interface for sending audio signals to and receiving audio signals from the headset;
   c. a third interface for sending audio signals to and receiving audio signals from the audio device; and
   d. a switching circuit coupled to the first interface, the second interface, and the third interface, wherein the switching circuit provides a communications link between at least two of the first interface, the second interface, and the third interface as a function of a selected mode, wherein a first communications link is provided between the second interface and the third interface when a first mode is selected, and a third communications link is provided between the first interface, the second interface, and the third interface when a third mode is selected such that the audio device provides audio signals to the headset and to the telephone headset amplifier over the third communications link.

2. The adapter apparatus according to claim 1 wherein when the first mode is selected, the audio device provides audio signals over the first communications link to the headset.

3. The adapter apparatus according to claim 2 wherein the audio device is one of a selective CD player, cassette tape player, MP3 player, sound card, CD-port from a computer, and another headset with a microphone.

4. The adapter apparatus according to claim 1 wherein when the first mode is selected, the audio device receives audio signals over the first communications link from the headset.

5. The adapter apparatus according to claim 4 wherein the audio device is one of a selective speech recognition device and audio recording device.

6. The adapter apparatus according to claim 1 wherein the switching circuit provides a second communications link between the first interface, the second interface, and the third interface when a second mode is selected, wherein the audio device receives audio signals from the headset and from the telephone headset amplifier over the second communications link.

7. The adapter apparatus according to claim 6 wherein when the second mode is selected, the audio device is one of a selective speech recognition device and audio recording device.

8. The adapter apparatus according to claim 6 wherein the second mode enables a conventional telephone call to be established between a user of the headset and a called party via the telephone headset amplifier.

9. The adapter apparatus according to claim 1 wherein when the third mode is selected, the audio device is one of a selective CD player, cassette tape player, MP3 player, sound card, CD-port from a computer, and another headset with a microphone.

10. The adapter apparatus according to claim 1 further comprising a mode selection switch for selecting the mode.

11. An adapter apparatus for coupling a headset and an audio device to a telephone headset amplifier, the apparatus comprising:
   a. a first means for sending audio signals to and receiving audio signals from the telephone headset amplifier;
   b. a second means for sending audio signals to and receiving audio signals from the headset;
   c. a third means for sending audio signals to and receiving audio signals from the audio device; and
   d. a switching means for coupling the first means, the second means, and the third means, wherein the switching means provides a communications link between at least two of the first means, the second means, and the third means as a function of selected mode, wherein a first communications link is provided between the second means and the third means when a first mode is selected, and a third communications link is provided between the first means, the second means, and the third means when a third mode is selected such that the audio device provides audio signals to the headset and to the telephone headset amplifier over the third communications link.

12. The adapter apparatus according to claim 11 wherein when the first mode is selected, the audio device provides audio signals over the first communications link to the headset.

13. The adapter apparatus according to claim 12 wherein the audio device is one of a selective CD player, cassette tape player, MP3 player, sound card, CD-port from a computer, and another headset with a microphone.

14. The adapter apparatus according to claim 11 wherein when the first mode is selected, the audio device receives audio signals over the first communications link from the headset.

15. The adapter apparatus according to claim 14 wherein the audio device is one of a selective speech recognition device and audio recording device.

16. The adapter apparatus according to claim 11 wherein the switching means provides a second communications link between the first means, the second means, and the third means when a second mode is selected, wherein the audio device receives audio signals from the headset and from the telephone headset amplifier over the second communications link.

17. The adapter apparatus according to claim 11 wherein when the second mode is selected, the audio device is one of a selective speech recognition device and audio recording device.

18. The adapter apparatus according to claim 11 wherein the second mode enables a conventional telephone call to be established between a user of the headset and a called party via the telephone headset amplifier.

19. The adapter apparatus according to claim 11 wherein when the third mode is selected, the audio device is one of a selective CD player, cassette tape player, MP3 player, sound card, CD-port from a computer, and another headset with a microphone.

20. The adapter apparatus according to claim 11 further comprising a mode selection switch for selecting the mode.

* * * * *